Figure 1:
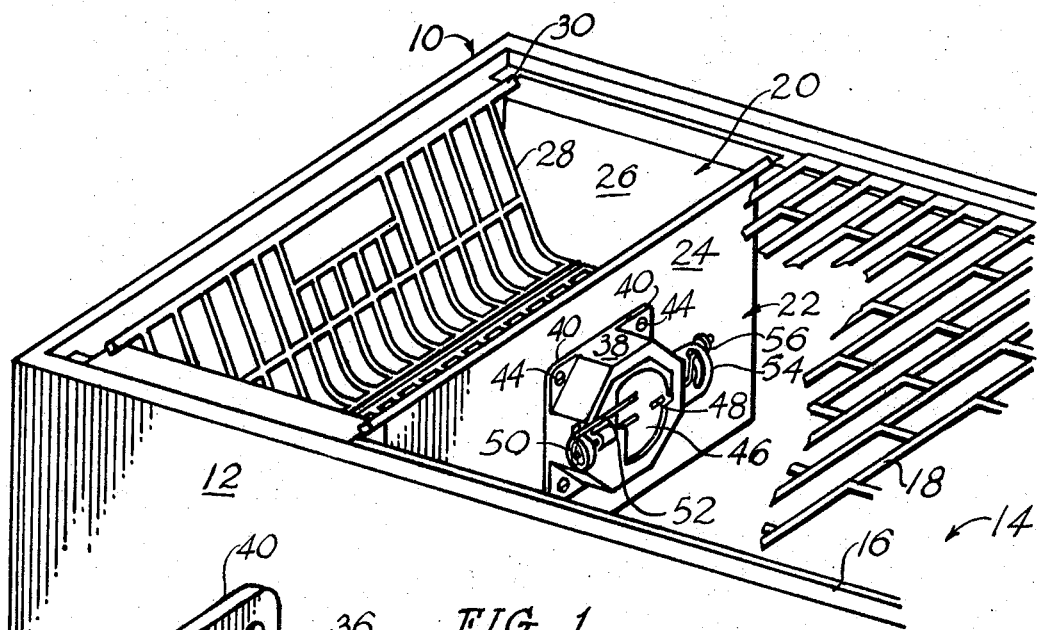

Sept. 12, 1967     W. H. TORIAN     3,340,864

SMOKE COOKING DEVICE

Original Filed July 17, 1961     2 Sheets-Sheet 1

INVENTOR.
WILLIAM HAROLD TORIAN
BY
ATTORNEY

INVENTOR.
WILLIAM HAROLD TORIAN

United States Patent Office 3,340,864
Patented Sept. 12, 1967

3,340,864
SMOKE COOKING DEVICE
William Harold Torian, P.O. Box 8041,
Dallas, Tex. 75205
Continuation of application Ser. No. 124,492, July 17, 1961. This application Apr. 12, 1965, Ser. No. 449,372
8 Claims. (Cl. 126—25)

This application is a continuation of my copending application Ser. No. 124,492, filed July 17, 1961, now abandoned.

This invention relates to a smoke cooking device and particularly to a device of this sort for cooking with hot smoke only which is one method for barbecuing meat. The instant device has to do with the control of the heat or hot smoke during the cooking.

Some cooking devices, such as outdoor cookers, employ a fire box of some sort in which is placed the fuel such as charcoal or wood. Such cookers are provided with a grill or grid on which the meat or other food is placed during the cooking operation. In the conventional open cooking or broiling operation, the cooker is open at the top and the food is cooked from the heat of the fuel in close proximity thereto. If the cooker is provided with a lid or cover, it may be closed and the cooking operation then becomes one of hot smoke or a combination of heat and hot smoke. Certain cuts of meat are cooked the best when subjected only to slow cooking from indirect heat such as produced in an oven, or even better still from the heated smoke which is allowed to come into contact with the meat. Control of the heat and the extent and duration of the hot smoke is important since this determines the speed at which the meat cooks. While some prior art devices are capable of being closed and to cook with hot smoke, there is inadequate means for setting or controlling the extent of the hot smoke.

The present device in one embodiment thereof is adapted to be applied to certain types of closed smoke cookers to provide a continuous control over the extent of the hot smoke.

Generally described, without restriction on the scope of my invention as defined in the appended claims, the instant invention finds application with use with cookers of the sort having a fuel box or fire box body constructed from sheet metal, cast iron or the like, on which there is located a movable lid or top capable of closing the fire box into a closed container and having suitable louvers or vents thereon from which heat and smoke may escape as well as having an ash door around the body of the fire box through which fuel may be added, or through which the contents may be inspected from time to time and basted or otherwise treated. One form of the present smoker accessory device comprises a sheet metal box or container closed on all sides and the bottom and open on the top except for one portion of one side which is closed by a thermostatically controlled draft device. The draft device of the present smoker comprises a casting or base member having an opening formed therein in communication with the interior of said smoker box through the opening in the side. A damper device on said base comprises a pivotally movable damper gate connected with a metallic coil spring device having a control member extending from it to said gate and responding to a change in temperature to expand and contract and to move the draft gate in response thereto. The draft gate is adjustable by means of an adjustment screw to pre-set the approximate temperature at which the gate opens and closes as well as the extent of opening or closing the opening at the time the gate does move. Inside the smoker box there is positioned a pair of cast iron grates extending from opposite sides down into the bottom of the box and forming a grate structure on which fuel, such as charcoal and wood and the like may be placed. The smoker box may be inserted or removed from a cooker preferably at one end thereof. In the operation of the device, the draft apparatus is placed pointing towards the open, inside portion of the fire box, and the grid of the cooker is positioned at a level suitable for cooking the food contained thereon. Once the fire is started in the smoker fire box, the lid of the cooker may be closed and the cooker left for a period of a time such as an hour or move without attention except perhaps for occasional basting of the food.

An object of this invention is to provide an automatically controlled smoker device for cookers.

A further object of this device resides in the draft controlled apparatus used with the instant automatic smoker device whereby the extent of cooking and of hot smoke may be pre-set and thereby regulated during the cooking time without constant attention.

An additional object of this invention is to provide a method of smoke cooking food on the closed inside of a cooker, employing a pre-set automatic draft control for controlling the heat of the hot smoke employed.

Still another object of this invention resides in the construction of the instant smoker device employing a removable fire box with a built-in draft control and having removable fuel grates thereon for quick assembling and disassembling and for cleanliness.

An additional object of the present invention resides in the construction of the smoker accessory whereby it may be substituted in conventional closed cookers for one or more of the grids or grates normally found thereon or may otherwise be applied to existing cookers with very little modification required.

A further object of this invention resides in the details of construction of the draft device whereby it may be pre-set to an approximate temperature operation and will maintain and regulate the heat of the smoke according to such setting.

An additional object of the present invention resides in the simplicity of the construction of the smoker fire box and the draft control attached thereto. An additional advantage is found in the use of removable fuel grates.

Figure 2:
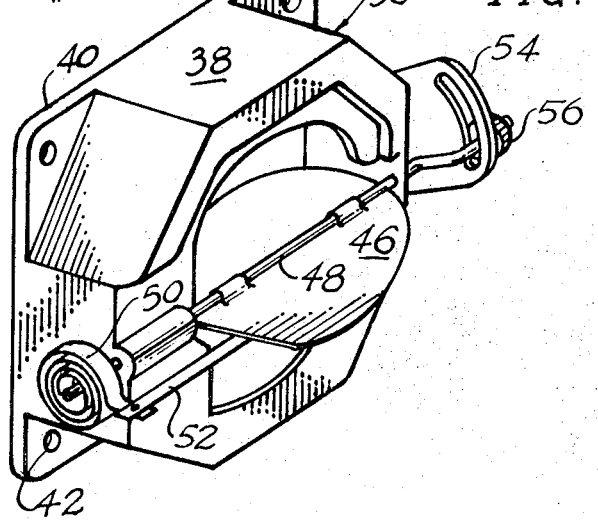
Figure 3:
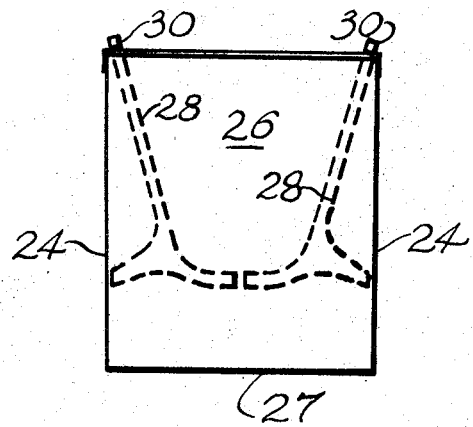
Figure 4:
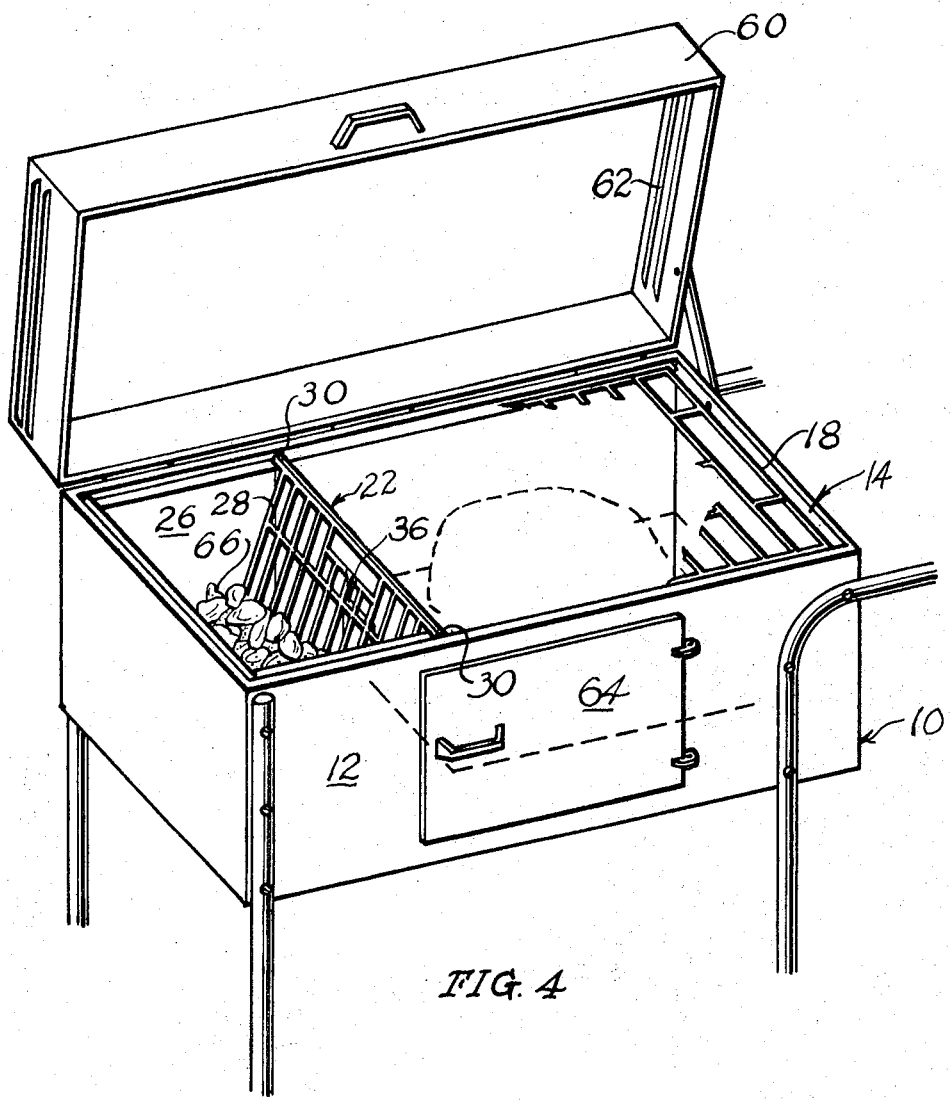

Other and further objects and advantages of my invention will become apparent upon reading the following specification taken in conjunction with the accompanying drawings, in which:

FIG. 1 is a perspective view of a portion of a cooker having an embodiment of the present smoker positioned for operation therein, FIG. 2 is a perspective view of the draft controller normally attached to the smoker shown in FIG. 1, FIG. 3 is an end elevation view of the fire box of the smoker shown in FIG. 1 and showing the removable cast iron fuel grates positioned therein, and FIG. 4 is a perspective view of a typical outdoor cooker having the smoker accessory of FIG. 1 positioned for operation therein.

Initially, it is pointed out that while the present device is advantageously adapted to be employed with existing cookers and to be used as a separate accessory purchased for use therewith, with little or no modification required, it is obvious that in the case of new cookers the present device may be manufactured or tailored so to speak peculiarly for that cooker and its dimensions and characteristics and the like. The novel method presented herein for controlling the smoke by means of a separate fire box with draft control whereby the smoke is controlled at the source of the heat is illustrated by a description of the particular type of smoker accessory shown in the various figures of the drawings.

In FIG. 1, a typical cooker 10 has a substantially rectangular fire box or body 12 normally closed on the sides, ends and bottom and being open at the top 14. The upper periphery or edge 16 of the body 12 has positioned thereon transversely thereacross a plurality of removable grids or grills 18 conventionally constructed from cast iron or cast aluminum and adapted to be removed easily and to be cleaned or replaced. The smoker attachment or accessory device 20 of the present invention is adapted to be positioned in one end or the other of such a typical cooker 10 by removing one or more of the grids 18 therefrom; or, if the cooker comes with grids or grill of continuous length which are not easily detached in an amount substantially equal to the size of the accessory, the grid or grill may be severed or cut with a hacksaw or the like at a distance corresponding with the size of the accessory 20 of the present invention.

Smoker accessory 20 is preferably constructed in the present embodiment with a sheet metal body or fire box 22 having sides 24 and ends 26 and a bottom 27 integrally connected together forming a closed box with an open top. A pair of curved, cast iron or cast aluminum or similar fuel or fire grates 28 of substantially identical but reverse construction are normally inserted in and supported upon opposite ends of the end walls 26 by means of lugs 30 protruding from the top of each of the grates 28. The grates 28 are curved inwardly at the bottom as shown in FIGS. 1 and 3 and closely approached touching each other in the interior of the bottom of the box 24 forming a grate on which charcoal or wood or other fuel may be placed with plenty of open grill work or grid work through which smoke and the like may pass. Grates 28 are easily and quickly removable simply by lifting from inside of the box and are replaced in a similar reverse operation.

On one side 24 of the box 22 there is located the automatic draft controller device 36 of the present invention comprising a cast iron or similar octagonal cap 38 with attachment flanges 40 having screw holes 42 therein through which screws 44 are inserted into the side wall 24 to attach the draft controller 36 firmly in place on the fire box 22. A draft gate 46 is pivotally mounted on a shaft 48 carried on the cap 38 and having the innermost end of a coil spring 50 attached to one end thereof. The other end of the coil spring 50 protrudes outwardly and has attached thereto a lever 52 having the other end fixed to the top portion of the draft gate 46. The other end of shaft 48 extends outwardly from cap 38 through a protruding control flange 54 mounted thereon and is provided with a knurled adjustment screw 56 adapted to be loosened for repositioning the gate 46 and to be re-tightened in place. According to this construction, the gate 46 normally occupies what may be considered an initial position determined by the position of shaft 48 in the plate 54 as determined by the screw 56. Therefore, the amount of opening through the cap 38 which exists at one extreme may be determined by the position of gate 46 which may be all the way closed or may be substantially open, depending upon the amount of draft desired at one extreme. Coil spring 50 is a metallic spring or similar material which responds readily to heat and which contracts in such a manner as to operate lever 52 on gate 46 thereby opening and closing said gate in said cap 38 and maintaining the gate in a selected position when the heat approaches and ultimately reaches a certain point. As the coil spring 50 cools, the reverse operation takes place and the draft gate 46 will again open. Since the fire or fuel that is burning is to be located on the grates 28 inside of the fire box 22 and substantially closed from the remainder of the cooker 10 the draft apparatus 36 automatically governs or throttles the amount of draft and controls the extremes thereof from what may be considered initial or open position to closed position as determined by the heat of the smoke.

The automatic damper 36 on the smoker can be set at the optimum temperature best suited for barbecuing and smoke cooking, and will control the heat thus preventing the drying out of the food. In operating the device, it is suggested that the fire in the smoker be allowed to settle for a period of time such as thirty minutes. Then, by checking the temperature with a hood gage or the like, the smoker can be adjusted at damper gate 46 to regulate the heat. For slow smoke cooking of typical meats, a temperature of 250–300 degrees Fahrenheit is recommended.

It is worthwhile to note that the smoker is designed and intended for barbecuing or cooking with hot smoke and is not particularly recommended for broiling steaks or for so-called open cooking which occurs when using a brazier or a cooker with the top open, although the device may be used in this manner if desired. In the operation of the device, reference is now made to FIG. 4 wherein is shown the complete cooker 10 which is provided with a movable top or lid 60 having louvers 62 in the ends thereof providing some manner of escape of smoke or heat. It is desirable that louvers 62 be controllable louvers provided with some type of plate means which may be shifted back and forth to open or close the louvers as desired. That is a conventional construction in such cookers and does not per se form any portion or part of this invention. The body 12 of the cooker 10 is provided with a front door or ash removal and cleaning door 64 providing access to the interior of the fire box 12. The grids or grills 18 on the cooker may be located at any height desired and it is perhaps desirable in some instances that they be moved from their uppermost position shown in FIG. 4 to a lower position down in the fire box when cooking certain types of large cuts of meat.

The smoker device 20 will burn substantially any type of fuel, however, it is recommended that one use only hardwoods, hickory, mesquite, or charcoal. This fuel 66 is placed in the bottom of the grates 28 and ignited to a suitable starting point. Any woods containing tars or rosins should not be used since the taste of them will be imparted to the food. The fire can be started in the smoker in a normal manner, however, it is recommended that the fire be started by using a small amount of charcoal, then add the dry wood of your choice for the smoke flavor. After the fire is started, it is not necessary to add additional charcoal, but one can continue using dry wood. It will be found that the fire box 22 can be fully fueled, as the automatic damper control 36 will control the heat at an optimum temperature best suited for smoke cooking. With the fire started, the smoker will take care of most cooking for an hour or more without attention, except for occasional basting of the food. The automatic damper control 36 can be set at the optimum temperature best suited for barbecuing and smoke cooking and will operate in this manner, thus preventing the drying out or abnormal cooking of the food. Plenty of time should be allowed when cooking with smoke, for example, a half of a chicken takes about four hours and a pork rib about three hours. Large roasts, hams or turkeys take a longer time, depending upon the weight and extent of thawing out when the cooking is started.

The ashes in the smoker should be emptied after each use, and this may be accomplished simply and entirely by removing the removable grates 28 or, if preferred, the entire smoker attachment device 20 may be removed from the interior of the fire box 12.

In carrying out the hot smoke cooking, the smoke passes upwardly from the smoker 20, some escaping through the louvers 62, and some passing downwardly over the food and returning to the smoker through the thermostatically-controlled gate 46. It is the temperature of this returning smoke to which the gate 46 responds, and it automatically positions itself to throttle the returning smoke and thus regulate its temperature. Of course, additional combustion air is constantly entering the cooking enclosure and passing to the burning fuel.

While I have shown and described a certain embodiment of my invention together with suggested mode of operation and use thereof, this is by way of disclosure only and is not to be construed as any sort of limitation on the scope of my invention since various changes, alterations, modifications, eliminations, substitutions, and variations may be made in the embodiment shown and described herein without departing from the scope of my invention defined in the appended claims.

What I claim and desire to secure by Letters Patent is:

1. In combination with a closed cooker, a smoker accessory mountable inside of the cooker for smoke cooking including a fire box for generating hot smoke to the interior of the closed cooker and having a large opening communicating with the cooker interior, and an automatic device for controlling draft through the opening and the recirculation of hot smoke from the interior of the closed cooker to the interior of the fire box.

2. The combination set forth in claim 1 including means for adjusting the automatic device to pre-set the same for controlling the approximate cooking temperature.

3. In combination with a closed cooker, a smoker accessory mountable inside of the cooker for smoke cooking including a fire box for generating hot smoke to the interior of the closed cooker, removable grates positioned in the fire box, an automatic draft controller on one side of said fire box for recirculating hot smoke from the interior of the closed cooker to the interior of said fire box, means for adjusting the automatic draft controller to pre-set same to control the approximate cooking temperature.

4. In combination with a closed cooker, a smoker accessory mountable inside of the cooker for smoke including a fire box having an open top for generating hot smoke to the interior of the closed cooker, removable grates positioned in the fire box, an automatic draft controller device on said fire box for recirculating hot smoke from the interior of the closed cooker to the interior of said fire box, and means for adjusting the automatic draft controller to pre-set same.

5. In combination with a closed cooker having a chamber and a closable lid with vents therein, a smoker accessory mountable in the chamber for smoke cooking including a smoker fire box for generating hot smoke to the chamber of the closed cooker and having a large open space therein through which smoke can circulate, a wall on the fire box normally separating said fire box from the rest of the chamber so as to separate the fire from the rest of said cooker, a draft control device mounted on the fire box wall and having controlled communication with said fire box and chamber to control the circulation of smoke throughout the open space of said fire box, the draft control device comprising a housing having an opening therethrough for recirculating hot smoke from the chamber of the closed cooker to said open space of said fire box, a draft control gate movably mounted in the opening of the housing, and means automatically responding to changes in temperature to move the gate.

6. In combination with a closed cooker having a chamber and a closable lid with vents therein, a smoker accessory mountable in the chamber for smoke cooking including a smoker fire box for generating hot smoke to the chamber of the closed cooker and having a large open space therein through which smoke can circulate, a wall on the smoker fire box normally separating said fire box from the rest of the chamber so as to separate the fire from the rest of said cooker, and a draft control device mounted on the fire box wall and having controlled communication with said fire box and chamber to control the circulation of smoke throughout the open space of said fire box, the draft control device having an opening therethrough for recirculating hot smoke from the chamber of the closed cooker to said open space of said fire box.

7. In combination with a closed cooker having a chamber and a closable lid with vents therein, a smoker accessory mountable in the chamber for smoke cooking including a smoker fire box for generating hot smoke to the chamber of the closed cooker and having a large open space therein through which smoke can circulate, a wall on the smoker fire box normally separating said fire box from the rest of the chamber so as to separate the fire from the rest of said cooker, a draft control device mounted on the fire box wall and having controlled communication with said fire box and chamber to control the circulation of smoke throughout the open space of said fire box, the draft control device comprising a housing having an opening therethrough for recirculating hot smoke from the chamber to the open space of said fire box, a draft control gate movably mounted in the opening of the housing, means responding to changes in temperature automatically to move the gate, and other means on said fire box adjustable to pre-set the position of said gate thereby pre-setting the temperature range in said cooker.

8. The combination of claim 7 wherein the means to move the gate includes a metal coil spring having one end attached to said gate.

References Cited

UNITED STATES PATENTS

| | | | |
|---|---|---|---|
| 2,174,663 | 10/1939 | Keller | 158—1 X |
| 2,312,339 | 3/1943 | Jones | 99—259 |
| 2,742,892 | 4/1956 | Herzer | 126—25 X |
| 2,842,043 | 7/1958 | Reuland | 99—259 |
| 2,851,941 | 9/1958 | Cogar. | |
| 2,867,208 | 1/1959 | True et al. | 126—276 |
| 2,909,170 | 10/1959 | Hathorn | 126—25 |
| 2,944,909 | 7/1960 | Ziegler | 99—229 |
| 3,139,349 | 6/1964 | Swartz et al. | 99—229 |

FOREIGN PATENTS

| | | |
|---|---|---|
| 687,324 | 2/1953 | Great Britain. |

CHARLES J. MYHRE, *Primary Examiner.*

HYMAN LORD, *Examiner.*